No. 885,230. PATENTED APR. 21, 1908.
W. VON DULONG.
APPARATUS FOR THE PRODUCTION OF GASES FROM HYDROCARBON.
APPLICATION FILED NOV. 5, 1906.
2 SHEETS—SHEET 1.
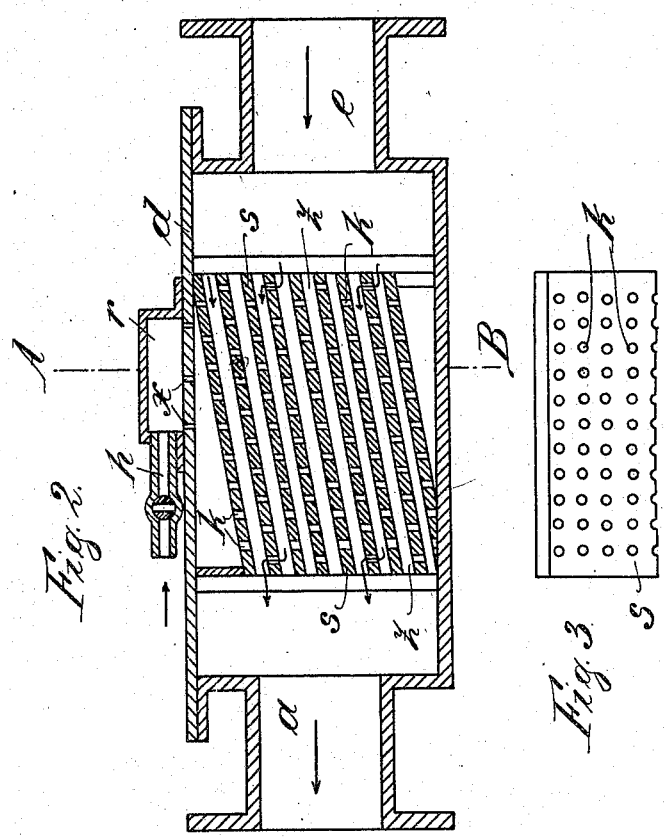
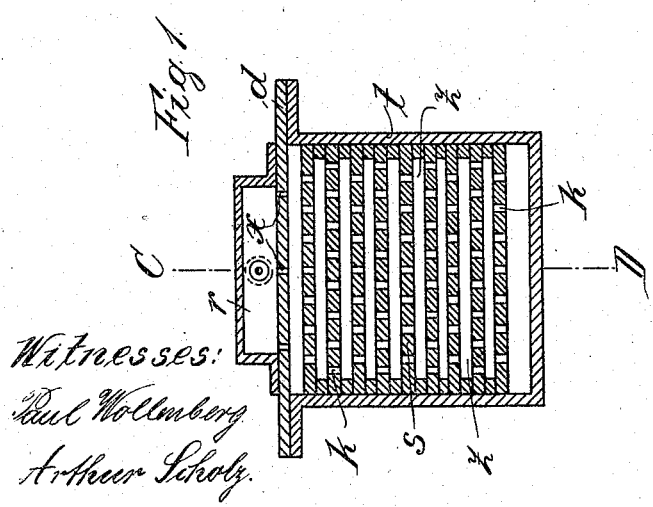

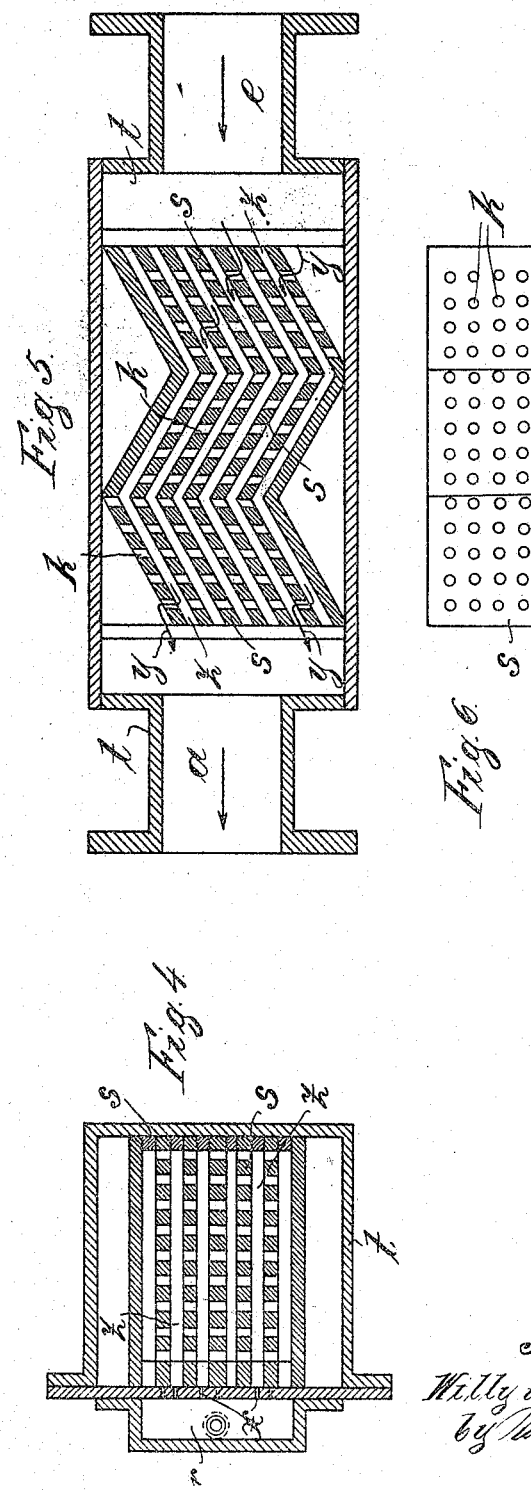

UNITED STATES PATENT OFFICE.

WILLY VON DULONG, OF WITASCHÜTZ, GERMANY.

APPARATUS FOR THE PRODUCTION OF GASES FROM HYDROCARBON.

No. 885,230.

Specification of Letters Patent.

Patented April 21, 1908.

Application filed November 5, 1906. Serial No. 342,300.

*To all whom it may concern:*

Be it known that I, WILLY VON DULONG, a subject of the King of Prussia, and resident of Witaschütz, District of Jarotschin, German Empire, have invented a new and useful Apparatus for the Production of Gases from Hydrocarbon, of which the following is an exact specification.

My invention relates to the production of gases from hydrocarbon and forms a further improvement of the contrivance as described and illustrated in my United States patent application filed at the same time with this application.

More especially my new device is intended to be used for carbureting air with heavy hydrocarbon in a cold way.

Heretofore one has proposed to carburet air with liquid hydrocarbon in a cold way either according to the spraying-, the surface-, or the evaporating-system, or by combining two of the aforementioned systems. If, however, the specific weight of the carbureting liquid exceeds 0.88, the known devices became useless, or they were unable for a continuous production of homogeneous gas.

According to the present invention resisting elements, being provided with straight and fine perforations or the like, are used and arranged at a certain angle towards the streaming direction of the air. These resisting elements consist of solid and thick plates or disks. Owing to the elements inclined and provided with passages the air when conducted with a certain over-pressure against this elements is caused to be divided and to form whirls, thereby dividing or tearing the liquid into fine carbureting mist suitable for saturating the air. By means of such devices all fuels can be used for carbureting purposes, even the so-called heavy oils.

In order to make my invention clear, reference is had to the accompanying drawings, in which:—

Figure 1 is a vertical cross section on line A—B of Fig. 2, Fig. 2 is a vertical longitudinal section on line C—D of Fig. 1, Fig. 3 is a fragmentary plan-view of a disk as used in the apparatus according to Figs. 1 & 2. Figs. 4 & 5 illustrate a modification in cross-section and longitudinal section respectively. Fig. 6 is a detail.

In the figures $t$ is a receptacle or vessel of any convenient shape closed by a cover $d$. $r$ is a chamber in communication with the conduit $h'$ to be shut off by a valve $h$. The wall of the receptacle within the chamber $r$ is perforated by perforations or passages $x$ discharging into the interior of the receptacle. $e$ is a socket-piece to which the conduit for the air is secured (not shown in the drawings) and $a$ is an outlet socket-piece for the carbureted air. $s$ are resisting elements or disks having inclined position towards the direction of the air draft. The successive inclined disks are arranged at a certain small distance from each other to form small interstices $z$ permitting of the air and the carbureting liquid to pass and to enter the capillary passages $k$ of the disks $s$. The passages of the different disks are arranged in such manner that the passage of the first disk is in alinement with the passage of the following third disk and so on.

The arrangement as foregoing described works in the following manner:—The air to be carbureted enters the vessel through the opening $e$ and flows through the interstices $z$. Owing to the inclined position of the disks $s$ the air jet pushes against it and is caused to be divided, to pass the perforations $k$ and to joint with the air in the higher situated interstices $z$. The small portions of carbureting liquid contained within the passages $k$ are moved rapidly along and thrown against the following resisting element, whereby a perfect dividing or tearing of the liquid takes place, as to form fine fog by means of which the air can easily be saturated. The interstices or slots $z$ must be sufficiently small in order to prevent the air from passing the same directly. In this latter case the air would unsatisfactorily be carbureted. In practice the width of the slots should not be beyond $2\frac{1}{2}$ millimeters; and furthermore the area of all the slots should not exceed or materially exceed the cross section of the sucking conduit of the motor. Referring to the passages the diameter must be chosen to permit of the carbureting liquid to pass easily and to moisten the surfaces situated between the passages.

Even heavy hydrocarbons can be used for carbureting purposes by means of this apparatus.

In the Fig. 3 the construction of the inclined disks $s$ is illustrated in a plan view.

In the Figs. 4 and 5 the disks have a zig-zag-shape, whereby the resistance offered to the passing air is increased. The fuel is introduced into a lateral chamber $r$ having fine openings x and conducted therefrom between the zigzag plates s and along the same. The carbureting of the air is effected by forcing or sucking the air into the interstices z. Owing to the inclination of the disks s the air impinges on the surface of the latter and on the edges of the passages k, through which the air partially passes and unites with the air jet of the following interstice, whereby a short and intensive whirling of the air is produced, and the above mentioned result is obtained.

It will be observed that, of course, other substances having a low specific weight such for instance as benzin and alcohol can be used in the aforementioned apparatus and will be more perfectly sprayed than hitherto.

Having thus fully described the nature of my invention, what I desire to secure by Letters Patent of the United States is:—

1. A carbureter for hydrocarbon, comprising in combination: a vessel having inlet and outlet openings for admitting air and carbureting liquid to the vessel, and discharging them therefrom, solid and thick plates or disks of metal having an inclined position towards the direction of the air draft and straight and fine passages or perforations, the disks being arranged in a small distance from each other.

2. A carbureter for hydrocarbon comprising in combination: a vessel having inlet and outlet openings for admitting air and carbureting liquid to the vessel, and discharging them therefrom, and solid and thick plates or disks having an inclined position towards the direction of the air draft, and straight and fine passages or perforations, the disks being arranged in a small distance from each other as to form slots, the total of the cross-sections of the slots (z) being about equal to the cross-section of the sucking conduit of the motor.

3. A carbureter for hydrocarbon comprising in combination: a vessel having inlet and outlet openings for admitting air and carbureting liquid to the vessel, and discharging them therefrom, solid and thick plates or disks having a zigzag shape and straight and fine perforations or passages, the disks being inclined towards the direction of the air-draft and being arranged in a small distance from each other.

4. A carbureter for hydrocarbon, comprising in combination: a vessel having inlet and outlet openings for admitting air and carbureting liquid to the vessel, and discharging them therefrom, solid and thick plates or disks having a zigzag shape and straight and fine perforations or passages, the plates or disks being inclined towards the direction of the air-draft and being arranged in a small distance from each other, as to form slots, the total of the cross-section of the latter being about equal to the cross-section of the sucking conduit of the motor.

In witness whereof I have hereunto set my hand in the presence of two witnesses.

WILLY VON DULONG.

Witnesses:
HENRY HASPER,
WOLDEMAR HAUPT.